(12) United States Patent
Ionescu et al.

(10) Patent No.: US 7,599,443 B2
(45) Date of Patent: Oct. 6, 2009

(54) METHOD AND APPARATUS TO BALANCE MAXIMUM INFORMATION RATE WITH QUALITY OF SERVICE IN A MIMO SYSTEM

(75) Inventors: Dumitru M. Ionescu, Dallas, TX (US); Balaji Raghothaman, Allen, TX (US)

(73) Assignee: Nokia Corporation, Espoo (FI)

( * ) Notice: Subject to any disclaimer, the term of this patent is extended or adjusted under 35 U.S.C. 154(b) by 538 days.

(21) Appl. No.: 10/940,060

(22) Filed: Sep. 13, 2004

(65) Prior Publication Data
US 2006/0056534 A1    Mar. 16, 2006

(51) Int. Cl.
*H04B 7/02* (2006.01)
(52) U.S. Cl. ...................................... 375/267
(58) Field of Classification Search ................ 375/267, 375/347, 349; 700/53; 455/101, 132–141
See application file for complete search history.

(56) References Cited

U.S. PATENT DOCUMENTS

2004/0171359 A1* 9/2004 Tirkkonen et al. ........ 455/127.1
2005/0111376 A1* 5/2005 Raghothaman et al. ..... 370/252
2007/0116091 A1* 5/2007 Kakura ...................... 375/130

FOREIGN PATENT DOCUMENTS

WO    WO-2004/077778 A1    9/2004

OTHER PUBLICATIONS

"Generalized Linear Precoder and Decoder Design for MIMO Channels Using the Weighted MMSE Criterion", Hemanth Sampath, IEEE Transactions on Communications, vol. 49, No. 12, Dec. 2001, pp. 2198-2206.

* cited by examiner

*Primary Examiner*—Sam K Ahn
(74) *Attorney, Agent, or Firm*—Harrington & Smith, PC

(57) ABSTRACT

In a wireless MIMO communication system, for N symbols of a frame of information, allocating $N_1$ symbols to a stronger eigen sub-channel and $N_2$ symbols to a weaker eigen sub-channel, where $N_1 > N_2$; determining a probability of reception error when transmitting the $N_2$ symbols through the weaker eigen sub-channel for an auxiliary signal-to-noise ratio; solving for a quality of service QoS of the weaker eigen sub-channel and if the QoS is less than a desired QoS, decreasing the value of N and repeating allocating symbols, determining the probability of reception error and solving for the QoS. Another aspect includes asymmetrically allocating spreading codes to a stronger eigen sub-channel and to a weaker eigen sub-channel such that the stronger eigen sub-channel is allocated more spreading codes than the weaker eigen sub-channel; and transmitting all systematic bits of turbo coded information over the stronger eigen sub-channel.

14 Claims, 7 Drawing Sheets

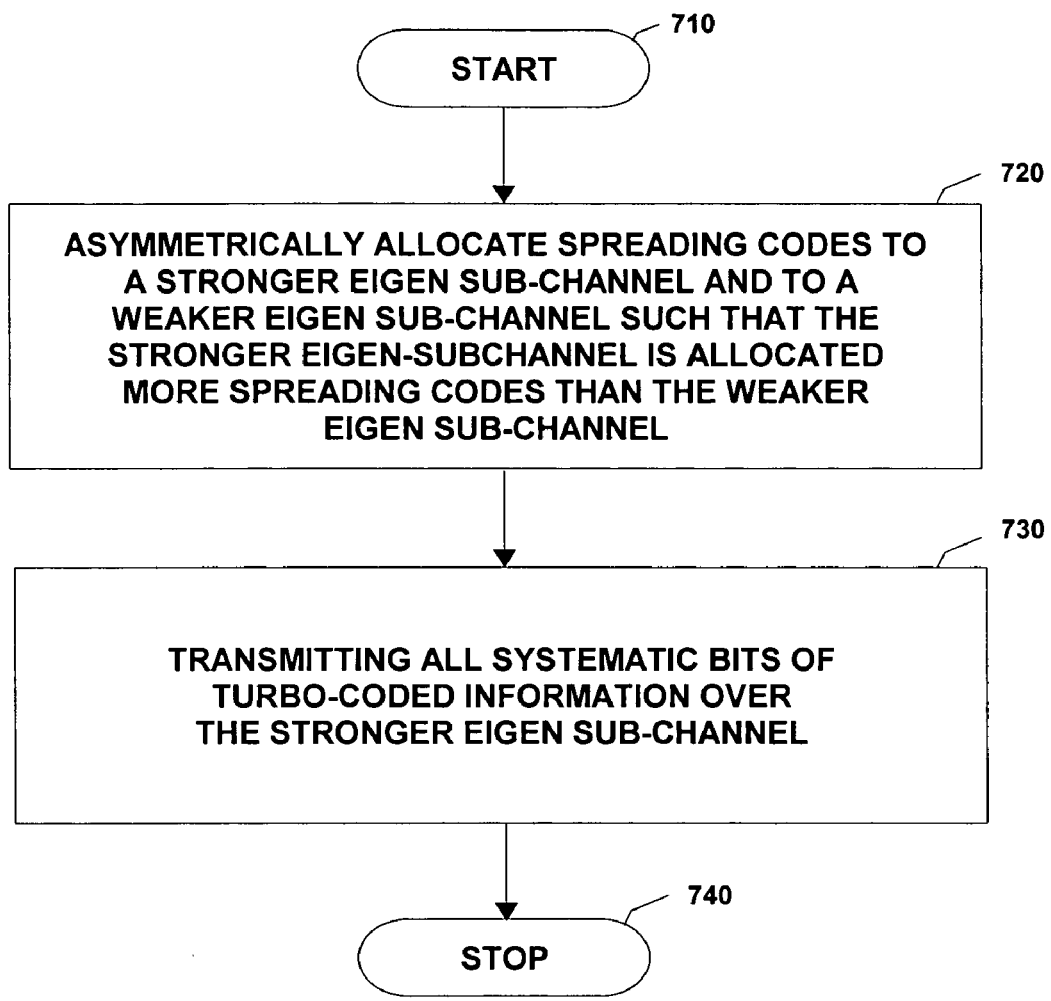

METHOD AND APPARATUS TO BALANCE MAXIMUM INFORMATION RATE WITH QUALITY OF SERVICE IN A MIMO SYSTEM

TECHNICAL FIELD

This invention relates generally to wireless communications systems, components and methods and, more specifically, relates to wireless communications systems, components and methods that employ at least some of transmit antenna diversity, space-time coding, spatial precoding, spatial redundancy, multiple input, multiple output (MIMO) systems, beamforming, adapting transmission parameters, multicarrier systems, multipath channels and closed loop schemes.

BACKGROUND

Practical schemes to utilize multiple antennas in wireless communications were initially directed towards achieving diversity gain (see Naguib, Tarokh, Seshadri and Calderbank, A space-time coding modem for high-data-rate wireless communications, IEEE JSAC, October 1998, and Alamouti, A simple transmitter diversity technique for wireless communications, IEEE JSAC 1998). Space-time coding was concentrated mainly on achieving the best possible performance using only the channel distribution known at the transmitter 12. In a parallel manner, the assumption that the instantaneous channel information is available at the transmitter resulted in work in transmission beamforming and in antenna selection (see: Farrokhi, Liu and Tassiulas, Transmit beamforming and power control for cellular wireless systems, IEEE JSAC, October 1998, Gelrach and Paulraj, Adaptive transmitting antenna methods for multipath environments, Globecom 1994, and Winters, Switched diversity with feedback for DPSK mobile radio systems, IEEE Tran. Veh. Tech., February 1983). These methods dealt with transmissions that have a channel rate of one symbol per channel or lower, and all of these diversity methods can be used even when there is only one receiver antenna. When multiple receiver antennas are available, these antennas were simply used to add receiver diversity gain.

The achievable capacity of MIMO wireless communications in the presence of multiple transmitter and receiver antennas was perceived to be much larger, as described by Telatar (Capacity of multi-antenna gaussian channels, Bell Systems Technical Journal, 1995) and by Fochsini and Gans (On the limits of wireless communications in a fading environment when using multiple antennas, Wireless Personal Communications, 1998). A step towards achieving this capacity was taken by the introduction of the layered space-time architecture, also known as diagonal BLAST, which explains how the multi-dimensional channel can be used to deliver several one-dimensional streams of data, in an environment where the channel state information (instantaneous Rayleigh fading channel value) is known at the receiver, but not at the transmitter (Varanasi and Guess, Optimum decision feedback multiuser equalization with successive decoding achieves the total capacity of the Gaussian multiple-access channel, Asilomar 1998). Vertical Bell Labs Layered Space-Time Code (V-BLAST), which is a simpler implementation, advocates a simple demultiplexing of the data stream instead of some specific encoding in space-time (see Wolniansky, Fochsini, Golden and Valenzuela, V-BLAST: An architecture for realizing very high data rates over the rich-scattering wireless channels, Signals, Systems, and Electronics, 1998. ISSSE 98. 1998 URSI International Symposium, September 1998). The corresponding receiver architecture for V-BLAST is also simpler (see Fochsini, Reinaldo, Valenzuela and Wolniansky, Simplified processing for high spectral efficiency wireless communications employing multi-element arrays, IEEE JSAC, November 1999). A step closer towards achieving capacity is taken by assuming the availability of some channel information at the transmitter. The PARC method (see Chung, Lozano and Huang, Approaching eigenmode BLAST channel capacity using V_BLAST with rate and power feedback, VTC Fall 2001) is an example of such a technique. Here, two antennas are allotted variable rates and powers, according to their respective channel conditions. The encoding is done separately on these two streams. In such a situation, the optimal receiver (in a capacity-achieving sense) was discussed by Varanasi and Guess (see Varanasi and Guess, Bandwidth-efficient multiple-access via signal design for decision feedback receivers: Towards an optimal spreading-code trade-off, Globecom 1997, and Varanasi and Guess, Optimum decision feedback multiuser equalization with successive decoding achieves the total capacity of the Gaussian multiple-access channel, Asilomar 1998).

It is pointed out that a further aspect of the foregoing, used in conjunction with rate control of the different streams, is the transmission of streams over eigen-beams rather than over separate antennas.

It should be noted, however, that the availability of channel information cannot be taken for granted, since it involves some reciprocity assumptions in the channel, or some feedback from the receiver. When partial channel knowledge is available, a criterion for switching between diversity and multiplexing was discussed in Heath and Paulraj, Switching between multiplexing and diversity based on constellation distance, Allerton 2000. More recently, multiplexing mechanisms specific to CDMA, which combine code multiplexing with space-time multiplexing, were presented by Huang, Viswanathan and Fochsini, Multiple antennas in cellular CDMA systems: Transmission, detection and spectral efficiency, IEEE T-Wireless, July 2002.

It has been shown in theory that the optimal approach for MIMO transmission, called the eigenmode or water-filling MIMO in the literature, is to transmit multiple streams of data, where the encoding rate and power allocation of each stream is tailored to the channel quality that is seen by each stream. Also, MIMO theory has shown that the best performance is obtained when a data packet is jointly encoded and interleaved across eigen-beams. One possible transmission technique for jointly encoded packets with a systematic code was referred to as Flexible Rate Split (FRS), where the number of systematic bits in each of the eigen-beams is controlled. In a simple yet practical implementation of the FRS algorithm for 2-beam transmission, as many systematic bits as possible are transmitted over the first stream, and the remaining systematic bits, as well as the parity bits, are transmitted over the second stream. It has been found that, for higher, fixed coding rates (>0.5 for 2-beam transmission), this technique produced poor frame error rates, even though the bit error rate performance was very good. The reason for this dichotomy is that, when the strength of the second eigen-beam is very poor (i.e., the channel is almost rank-1), some systematic bits are lost in the second beam, hence giving rise to poor decoding performance.

Related to the foregoing, known types of algorithms that attempt to implement maximum information rate designs typically employ water-filling or water-pouring optimization at the transmitter (part of encoding and modulation), when the channel state information is available to the transmitter. In essence, the water filling approach identifies and accesses sub-channels defined by eigenmodes of a MIMO channel matrix, and then allocates optimal fractions of the total energy available at the transmitter to the available sub-channels. The two main assumptions underlying this approach are that: (1) the encoding and modulation scheme is capable of operating at, or near, information capacity limits, and (2) ergodicity holds, i.e. theoretical ensemble averages are achievable via time averages. The ergodicity insures that the resulting information rate can be attained with arbitrarily low error probability by the coding scheme, in the channel under consideration, via an adequate number of exposures of the coded symbols to sufficient channel realizations. When the first assumption is true, the inherent discarding of one or more sub-channels during water-pouring, as is recognizable by the presence of the $(\cdot)_+$ operator, which replaces a negative argument by 0 in the solution to the water-filling problem, has no sensible impact on performance as long as information capacity is well-defined, and the systems remains in the proximity of capacity limits. Reference with regard to the presence of the $(\cdot)_+$ operator can be made to: M. Medard, "The effect upon channel capacity in wireless communications of perfect and imperfect knowledge of the channel," IEEE Trans. Inform. Theory, vol. IT-46, pp. 933-946, May 2000; R. G. Gallager, Information Theory and Reliable Communication, New York: Wiley, 1968;T. M. Cover, and J. A. Thomas, Elements of Information Theory, New York: Wiley, 1991; and H. Sampath, P. Stoica, and A. Paulraj, "Generalized Linear Precoder and Decoder Design for MIMO Channels Using the Weighted MMSE Criterion," IEEE Trans. Commun., vol. 49, no. 12, pp. 2198-2206, December 2001.

However, the foregoing assumption is often not true, as the coding scheme can typically operate away from information capacity limits. Regarding the second assumption, it is itself often precluded by the fact that the channel is quasi-static, or encoding is performed without sufficient exposures of the coded symbols to enough channel realizations. Furthermore, in quasi-static scenarios the meaningful information theoretic limit is given by outage capacity, rather than ergodic (Shannon) capacity.

When either of the above assumptions is not met, discarding one or more eigen sub-channels (as a result of implementing some water-filling algorithm) impacts the performance corresponding to that particular realization of the MIMO channel matrix. The situation becomes more problematic in any MIMO systems (e.g., in a 1XEvDV MIMO system) that use a quasi-complementary approach to (possibly capacity achieving) adaptive coding schemes. One example is a turbo scheme, whereby systematic information must be transmitted (1) in its entirety (i.e., without puncturing), (2) separately from parity check information, and (3) while adaptively controlling the overall code rate (spectral efficiency) by sending all systematic symbols, and only a part of the parity check symbols. In the above scenario, MIMO channels arise from the use of multiple transmit antennas in order to either: provide a spatial dimension to the encoder (e.g., space-time codes); or, to add further spatial redundancy whenever possible, via eigen beamforming or (MIMO) channel preceding.

A goal in 3.5 G and 4 G (respectively, generation three-and-a-half and four) systems is to a achieve high data rate at relatively low cost. Throughputs of 1 Gbps (local area) or 10 Mbps (wide area) result in high spectral efficiencies. Physical limitations due to higher propagation losses incurred at the higher carrier frequencies to be used in 4 G systems result in smaller cell areas. Especially in 3.5 G systems, capacity and throughput are at a premium.

As a result, it can be appreciated that efficient resource allocation is crucial in achieving the targeted throughput, while still controlling cost. Bit loading and, in general, controlling the relevant transmission parameters are important elements when attempting to approach the capacity limits, and to thereby use the spectral resources efficiently. All schemes that are known to the inventors for attempting to achieve optimum resource allocation at the transmitter (which presumably has channel state information) require preceding, with the goal of accessing the eigen sub-channels in an optimal manner.

Based on the foregoing, it should be appreciated that a need exists to provide a solution to those operational scenarios that recognize a need to treat some of the coded symbols preferentially, by a QoS guarantee, where an example encompasses the systematic symbols in a turbo coded frame. In this case, the systematic symbols are key to the successful decoding of a particular frame, and are important when it is desired to reduce the number of frame retransmissions.

In MIMO channels that admit eigenmodes, one technique to insure preferential treatment for some of the coded symbols is to mount the critical coded symbols, e.g., the systematic symbols in a turbo code, on the stronger eigen sub-channel(s). However, a problem can arise if the available sub-channels cannot accommodate all of the critical symbols in a frame, and may result in having to de facto drop some of the critical symbols.

It quickly becomes apparent that a pure eigen beamforming approach creates the risk of being unable to transmit all of the critical (e.g., systematic) symbols, should the water-filling approach result in 'clipping' the weaker eigen sub-channel, unless, of course, the base station is willing to reduce the throughput for that particular frame in order to allow a resultantly smaller number of systematic symbols per frame to fit entirely on the stronger eigen sub-channel(s).

Generally, conventional approaches to the foregoing problems focus on pure water-filling designs, which attempt to maximize the information rate. However, many current systems do not accommodate operation near the information capacity limits. This can be due to the use of legacy designs, or to short duration frame and slot structures that preclude sufficient channel variation at reasonable rates of change (with respect to channel estimation).

It is noted that some MIMO transmission methods exist for splitting an encoded data packet into multiple streams without differentiating between the streams (Double Space-Time Transmit Diversity (DSTTD), DABBA and Vertical Bell Labs Layered Space-Time Code (V-BLAST). Techniques also exist for splitting the data into multiple packets of different sizes and encoding them separately (Per Antenna Rate Control (PARC)).

However, no adequate solutions are known by the inventors for coping with the preferential treatment of a subset of coded symbols, such as the systematic symbols in a turbo coded frame, during transmission via eigen sub-channels of a MIMO channel.

SUMMARY OF THE PREFERRED EMBODIMENTS

The foregoing and other problems are overcome, and other advantages are realized, in accordance with the presently preferred embodiments of these teachings.

The embodiments of this invention alleviate the foregoing and other problems in the context of a packet data channel, such as (but not limited to) a CDMA 1X EV-DV packet data channel.

In one aspect, illustrated below for the case when the number of eigenmodes equals two, this invention provides a method to operate a wireless MIMO communication system, where the method includes, for N symbols of an information carrying frame to be transmitted through a plurality of eigen sub-channels; in the exemplary scenario mentioned above, this is accomplished by allocating $N_1$ symbols to a stronger eigen sub-channel and $N_2$ symbols to a weaker eigen sub-channel, where $N_1 > N_2$; determining a probability of reception error when transmitting the $N_2$ symbols through the weaker eigen sub-channel for an auxiliary signal-to-noise ratio; solving for a quality of service QoS of the weaker eigen sub-channel and if the QoS is less than a desired QoS, decreasing the value of N and repeating allocating symbols, determining the probability of reception error and solving for the QoS. In a preferred, but non-limiting embodiment, the symbols are systematic symbols output from a turbo coder, and thus replicate the original source bits.

In another aspect this invention provides a method to operate a wireless MIMO communication system that includes asymmetrically allocating spreading codes to a stronger eigen sub-channel and to a weaker eigen sub-channel such that the stronger eigen sub-channel is allocated more spreading codes than the weaker eigen sub-channel; and transmitting all systematic bits of turbo coded information over the stronger eigen sub-channel.

Further aspects of this invention relate to MIMO communication systems, including FRS MIMO systems, that include a transmitter having a plurality of antennas and a transmitter controller coupled to the antennas for generating eigen sub-channels towards a receiver, where the transmitter controller includes a data processor that is responsive to execution of a stored program to operate in accordance with one or both of the methods described above.

It is also within the scope of the embodiments of this invention, during the operations of allocating, determining and solving, to jointly adapt at least the constellation size (e.g., 4PSK, 16QAM) and the number of spreading codes (Walsh codes) in an asymmetric allocation of spreading codes.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 7 is a flowchart depicting a method according to an embodiment of the invention.

DETAILED DESCRIPTION OF THE PREFERRED EMBODIMENTS

By way of introduction, the inventors have observed with regard to the exemplary scenarios discussed above that, since systematic symbols are crucial to the detection of a turbo code, it is not acceptable for systematic symbols to be punctured-neither intentionally nor de facto, as a result of discarding a weak sub-channel during water-filling. Rather, a QoS policy should be enforced for the transmission of systematic bits, even at the cost of reducing somewhat, if necessary, the overall throughput (spectral efficiency) of a current frame.

Figure 1:
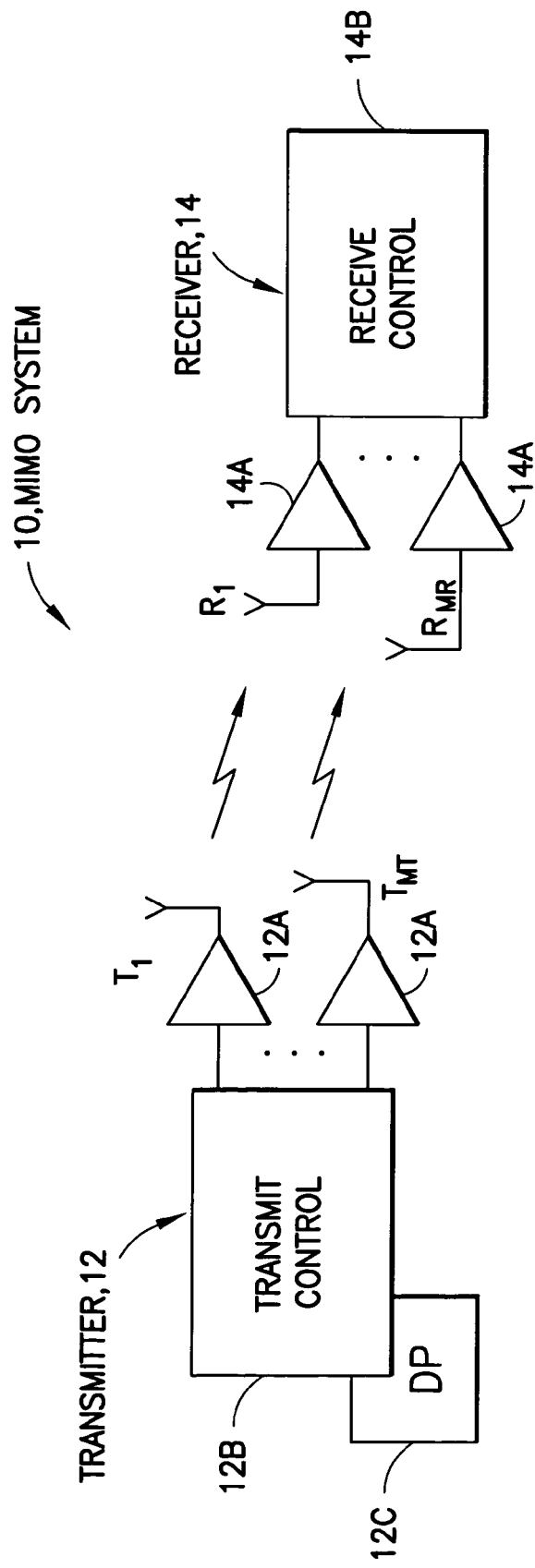
FIG. 1 is a block diagram of a MIMO system that is suitable for practicing this invention.

FIG. 1 is a block diagram of a MIMO system 10 that is suitable for practicing this invention. The MIMO system 10 includes a transmitter 12 and a receiver 14. The transmitter 12 has a plurality of transmit (T) antennas ($T_1$-$T_{MT}$) and associated transmit amplifiers 12A, and a transmit control function 12B. The receiver 14 has a plurality of receive (R) antennas ($R_1$-$R_{MR}$) and associated receive amplifiers 14A, and a receive control function 14B. In general, $M_T$ may or may not equal $M_R$, and both are greater than one. The transmit control function 12B is assumed to include one or more sources of data, as well as an encoder and modulator, and any other circuitry needed to transmit data, preferably packet data (control and/or traffic data packets), to the receiver 14. The receive control function 14B is assumed to include one or more data sinks, as well as a complementary data decoder and demodulator, and any other circuitry needed to receive data, preferably packet data, from the transmitter 12.

In the presently preferred embodiments of this invention the transmit control function 12B is assumed to include at least one data processor (DP) 12C that is operable to execute program code in order to perform the methods in accordance with the preferred embodiments.

The receiver 14 may be embodied in, but is not limited to, a cellular telephone, a personal digital assistant (PDA), a portable computer, an image capture device such as a digital camera, a gaming device, a music storage and playback appliance, and in handheld, portable units or terminals that incorporate combinations of such functions. The transmitter 12 may be a base station. However, in other embodiments of this invention the transmitter 12 may be embodied in the portable wireless device, and the receiver in a fixed network element such as a base station. In the preferred yet non-limiting embodiment the transmitter 12 and the receiver 14 are CDMA-compatible.

It should be appreciated that the presently preferred embodiments of the invention discussed in detail below are applicable in general to any wireless communications scenario that assigns special significance to some of the coded symbols, or that cannot tolerate puncturing of some of the coded symbols.

For all application scenarios that recognize a need to treat some of the coded symbols preferentially, a desirable approach is one that relies on some QoS guarantee for the relevant subset of coded symbols. In MIMO channels that admit eigen modes, one way to insure preferential treatment for some of the coded symbols is by mounting the critical coded symbols, e.g. systematic symbols in a turbo code, on the stronger eigen sub-channel(s). As was noted previously, a possible problem arises when the available sub-channels cannot accommodate all of the critical symbols in a frame, and may in fact need to de facto drop some of the critical symbols.

Motivated by the above considerations, the presently preferred embodiments of this invention operate such that, if MIMO channel state information is available at the transmitter 12, then given a desired throughput for a particular (current) frame, one should implement some, or all, of the following procedures: (A) employ a maximum information rate design, whereby allocation of available transmitter 12 resources is optimized via, preferably but not by way of a limitation, the water-filling algorithm or a variation thereof, for a known MIMO channel state; or, should the water-filling algorithm result in discarding an eigen sub-channel for that particular realization of the MIMO channel, (B) employ a QoS design that attempts to guarantee a certain quality of service for critical (e.g., systematic) coded symbols mounted on the weaker sub-channel(s), while preserving the throughput for the frame to be transmitted. Alternatively, if the optimization problem has no solution for the given frame throughput, (C) to iteratively find the closest lower throughput that admits a solution to the QoS problem, and implement the QoS solution for the resulting frame throughput.

The foregoing presently preferred approach to MIMO system optimization is readily implementable from a complexity perspective, and certain aspects of the mathematical formalism that sets a foundation for the embodiments of this invention are established in H. Sampath, P. Stoica, and A. Paulraj, "Generalized Linear Precoder and Decoder Design for MIMO Channels Using the Weighted MMSE Criterion," IEEE Trans. Commun., vol. 49, no. 12, pp. 2198-2206, December 2001, incorporated by reference herein.

The disadvantages inherent in reducing the throughput of a particular frame, or codeword, can be avoided in many cases when the use of the water-pouring algorithm would require that a sub-channel be dropped, provided that one can solve the problem of: finding an optimum allocation of total available transmit energy to both eigen sub-channels. This is important in order to guarantee a certain QoS for the systematic bits on the weaker eigen sub-channel. Intuitively, success would occur at least in those cases when the stronger sub-channel can afford to donate some energy to the weaker sub-channel, without endangering its own payload; the best effort that can be made in the majority of the cases is achieved to the extent that the QoS problem has an optimal solution, as detailed below.

The system and method in accordance with the presently preferred embodiments of this invention reduce the throughput price that results from reducing the throughput of a particular frame, or codeword, in a significant fraction of cases when plain water-pouring (where the goal is to maximize the information rate) would require that a sub-channel be dropped; and furthermore facilitate successful frame decoding during a first attempt, thereby contributing to reducing the number of retransmissions and enhancing the utilization of the available bandwidth.

In an exemplary and non-limiting use of the embodiments of this invention, assume a turbo coded system wherein the following conditions are found: encoding and modulation (possibly trellis coded modulation) generate at least one stream of encoded symbols; prior to either modulation or routing of complex symbols to antennas, the systematic symbols are collected over an entire frame (predefined number of transitions through a multidimensional trellis), or codeword, then separated from the parity check symbols to allow variable puncturing of the latter and/or interleaving, with the intent being to control the overall code rate (spectral efficiency); and the groups of all relevant coded symbols, systematic symbols, parity check symbols from one or more constituent encoders, and perhaps complex valued and/or interleaved—are repeated, and/or interleaved, and/or punctured, then demultiplexed for transmission from $M_T>1$ transmit antennas.

Assume further in this regard that: the overall code rate, after all puncturing and/or repetition, exceeds $1/M_T$; and, that some of the coded symbols in a frame are more important, or critical, than others in the same frame, e.g., to the successful decoding of that particular frame, possibly from the perspective of reducing the number of frame retransmissions.

It has conventionally been assumed that, given the special status of the systematic symbols in the decoding of a turbo-coded frame, it is desirable to try to send as many systematic symbols on the stronger eigen sub-channel(s), thereby reducing the probability of incorrect frame decoding, and of retransmissions.

To further simplify the description, and only for non-limiting descriptive purposes, further assume in FIG. 1 that the number of transmit (T) and receive (R) antennas are, respectively, $M_T=2$, $M_R \geq 2$, and that the eigen sub-channels of the MIMO channel are ordered in decreasing order, with the first being the stronger eigen sub-channel.

The above assumption concerning the code rate (i.e., being in excess of $1/M_T$) implies that not all systematic symbols can fit on the first (stronger) eigen sub-channel, and the pure eigen beamforming approach creates the risk of being unable to transmit all of the systematic symbols, should the water-filling approach result in 'clipping' the weaker eigen sub-channel.

The foregoing is an exemplary description of the general problem setting; it being realized however that the MIMO channel matrix can arise in a variety of scenarios, including single carrier flat fading, multi-carrier OFDM, and single carrier multipath channels. The general problem is overcome by the use of the presently preferred embodiments of this invention that employ the above-noted three-pronged approach.

The first approach, i.e., that of employing a maximum information rate design (approach (A) above), is known and can be based on the water-pouring algorithm. To illustrate the second and third approaches in accordance with this invention (approaches (B) and (C) above), assume that N represents the total number of systematic symbols in a frame, k denotes the overall code rate (after any symbol repetition and/or puncturing), and that $M_T=2$, $M_R \geq 2$ are the number of transmit and receive antennas, respectively. Let the total power available for one use of the MIMO channel be $p_0$. Then the number of channel uses on each eigen sub-channel is $M=N/kM_T$. Further, if $k>1/M_T$, then $N_1=M$ systematic symbols will fit on the stronger eigen sub-channel, while $N_2=N-M>0$ systematic symbols need to be mounted on the weaker eigen sub-channel.

It is desired to seek a QoS design that guarantees that at least $N_2$ symbols in the weaker, independent, eigen sub-channel can be decoded correctly, as a necessary condition for correctly receiving the systematic symbols mounted on the weaker eigen sub-channel. Then the probability of a bit error on the second eigen sub-channel must verify, necessarily, $P_{e,2} \leq (M-N_2)/M$. It is known that, conditioned on a SNR value $\Gamma_i$ on eigen sub-channel i, the probability of a bit error is $P_{e,i} \approx N_{e,i} Q(\sqrt{\beta_{M_i} \Gamma_i})$, where $M_i$ is the constellation size on the ith eigen sub-channel, $\beta_{M_i}=3/(M_i-1)$, and $N_{e,i}$ is the number of nearest neighbors (see, for example, H. Sampath et al., Eq. (24)).

Note that each eigen sub-channel may use the same type of modulation, for example, both could use, as non-limiting examples, 16-QAM or 4-PSK, or they could use different types of modulation, for example the stronger (highest SNR) eigen sub-channel could use 16-QAM and the weaker eigen sub-channel could use 4-PSK. For the case of 16-QAM $M_i$=16, while for 4-PSK $M_i$=4.

Figure 2:
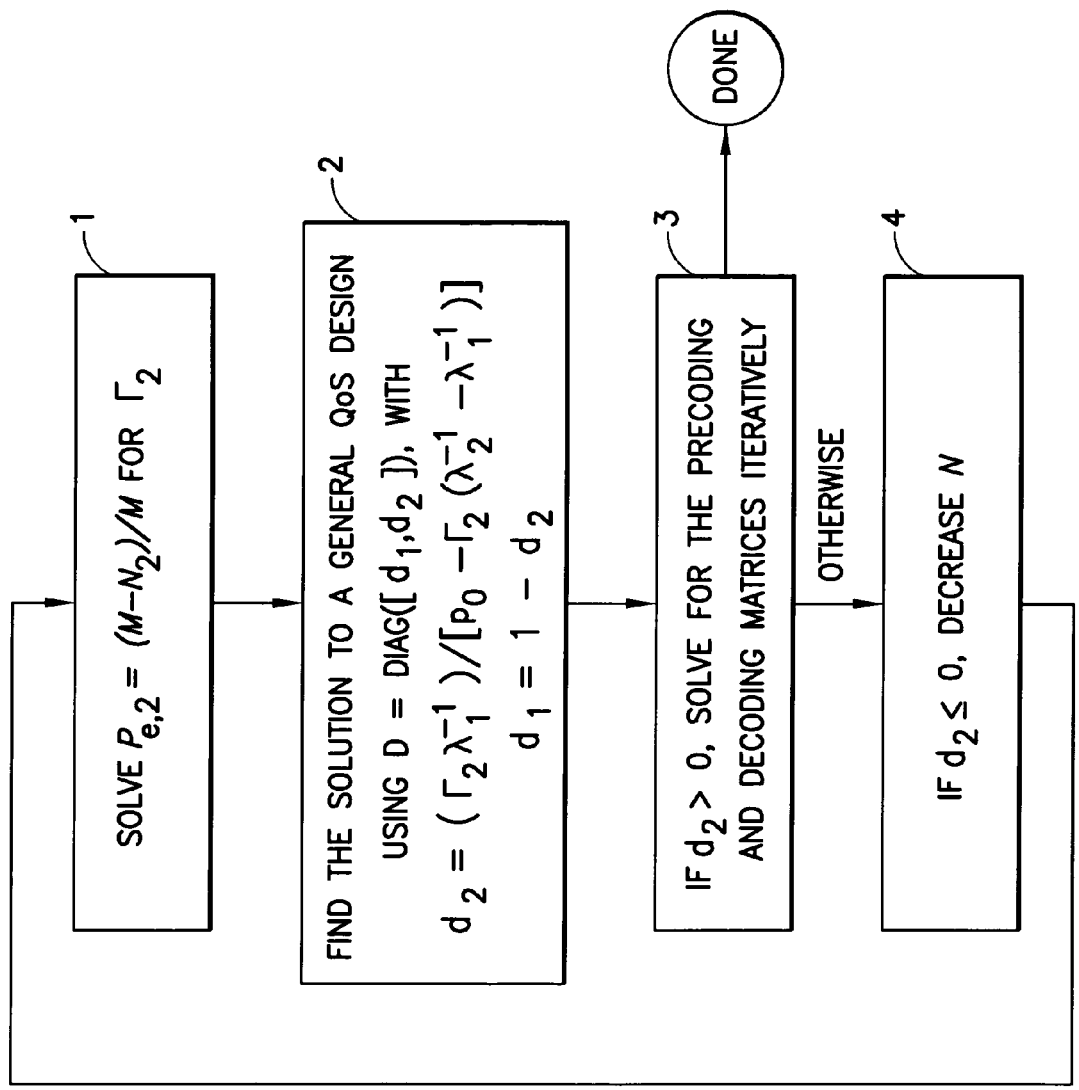
FIG. 2 is a logic flow diagram in accordance with an embodiment of this invention, that can be executed by the transmit control block of FIG. 1.

Referring to the logic flow diagram of FIG. 2, the DP 12C of FIG. 1 operates to implement the following algorithm (which can be executed on a frame-by-frame or other repetitive basis to accommodate changes in the channels between the transmitter 12 and the receiver 14):

1. Solve $P_{e,2}$=(M−N$_2$)/M for $\Gamma_2$ (where M represents the aggregate number of complex symbol epochs, and $\Gamma_2$ is an auxiliary SNR for the second (weaker) eigen sub-channel); then,
2. Find the solution to a general QoS design, such as the one described in H. Sampath et al., V.B, by using D=diag([d$_1$, d$_2$]), such as in H. Sampath et al., Eq. (29), with $d_2 = (\Gamma_2 \lambda_1^{-1})/[p_0 - \Gamma_2(\lambda_2^{-1} - \lambda_1^{-1})]$, $d_1 = 1 - d_2$, where $\lambda_1 \geq \lambda_2$ are the (fixed and known, since channel state information is assumed available at the transmitter) eigen values of the relevant, given MIMO channel matrix, and where $d_2$ is an intermediate expression having a value that depends on the SNR. Note that the above expression for $d_2$ can be found by manipulating $\Gamma = [\Gamma_1, \Gamma_2] = \gamma D$, and $\gamma = p_0/\text{Tr}(\Lambda^{-1} D)$ (see H. Sampath et al., V.B);
3. If $d_2 > 0$ then it is indicated that there is a solution that will guarantee the desired probability of error on the weaker eigen sub-channel, and one may solve for the precoding and decoding matrices iteratively, using if desired a known technique, such as the technique of H. Samath et al.; otherwise,
4. If $d_2 \leq 0$ then it is indicated that there is no solution that will guarantee the desired probability of error on the weaker eigen sub-channel; i.e., there is no solution than can facilitate correct reception of the systematic symbols mounted on the weaker eigen sub-channel. In this case, the algorithm decreases N, and returns to Step 1 to iteratively execute the algorithm until an acceptable solution is found ($d_2 > 0$). Decreasing N has the effect of increasing $P_{e,2}$, decreasing $\Gamma_2$ and increasing the denominator in expression for $d_2$, eventually rendering it positive at Step 3.

It is also within the scope of the embodiments of this invention, during the operations of allocating, determining and solving given above, to jointly adapt at least the constellation size (e.g., 4PSK, 16QAM) and the number of spreading codes (Walsh codes) in an asymmetrical allocation of spreading codes.

At least in those scenarios that admit solution, and where the stronger eigen sub-channel is strong enough to allow 'donation' of some energy to the weaker eigen sub-channel, without impacting the systematic symbols mounted on the former, all systematic symbols will likely be received correctly. This is a beneficial result that is achieved without degrading the throughput in that particular frame.

Note that the foregoing algorithm assumes some knowledge of the channel(s) between the transmitter 12 and the receiver 14 for determining the SNR value, and may thus rely on some type of channel state or condition feedback from the receiver 14 to the transmitter 12 (unless the system happens to be a time division duplex (TDD) system where the transmitter 12 and receiver 14 continuously switch roles and transmit and receive through the same channel at different times).

In a further aspect of this invention the foregoing problems are overcome by allocating an unequal number of Walsh codes over different eigen-beams or antennas for the same user. More particularly, in this embodiment the transmit control function 12B operates such that the principal eigen-beam/antenna is allocated more Walsh codes as compared to the second eigen-beam/antenna. This enables all the systematic bits to be transmitted over the principal eigen-stream/antenna, allowing for the successful transmission of a frame in cases where a symmetric allocation of Walsh codes would lead to a loss of the frame due to the low strength of the second beam/antenna. This aspect of the invention also provides a counterpart to the PARC scheme that allows for an asymmetrical number of Walsh codes to be assigned to the two independently encoded packets.

Consider in this regard a MIMO packet structure with a symmetrical Walsh code allocation, wherein a packet, of size N is transmitted in MIMO fashion using L Walsh codes across two eigen-beams or antennas. Let each Walsh code be capable of carrying P coded symbols. The antenna configuration is M×2, where M>=2.

Assume that the coding rate associated with the data packet is k>0.5. The number of systematic bits in the turbo-coded packet are thus kN. In the FRS implementation, where one would place as many systematic bits as possible in the "better" MIMO stream, N/2 systematic bits are placed in the first stream and the remaining (k−0.5)N bits are placed in the second stream.

Consider now the asymmetrical code allocation in accordance with this aspect of the invention. Here, the first eigen-beam/antenna is allocated $L_1 = \lceil (k-0.5)N/P \rceil$ Walsh codes (where $\lceil \ \rceil$ is the ceiling function), while the second beam/antenna is allocated $L_2 = 2L - L_1$ Walsh codes. This ensures that all the systematic bits are transmitted over the first beam/antenna.

Discussing this further aspect of the invention now in greater detail, the Flexible Rate Split (FRS) MIMO approach provides a method to more efficiently transmit in the currently defined data rates in a 1X-EV-DV system. At the same time, the peak rates can be increased by additional entries to a link adaptation table.

Figure 3:
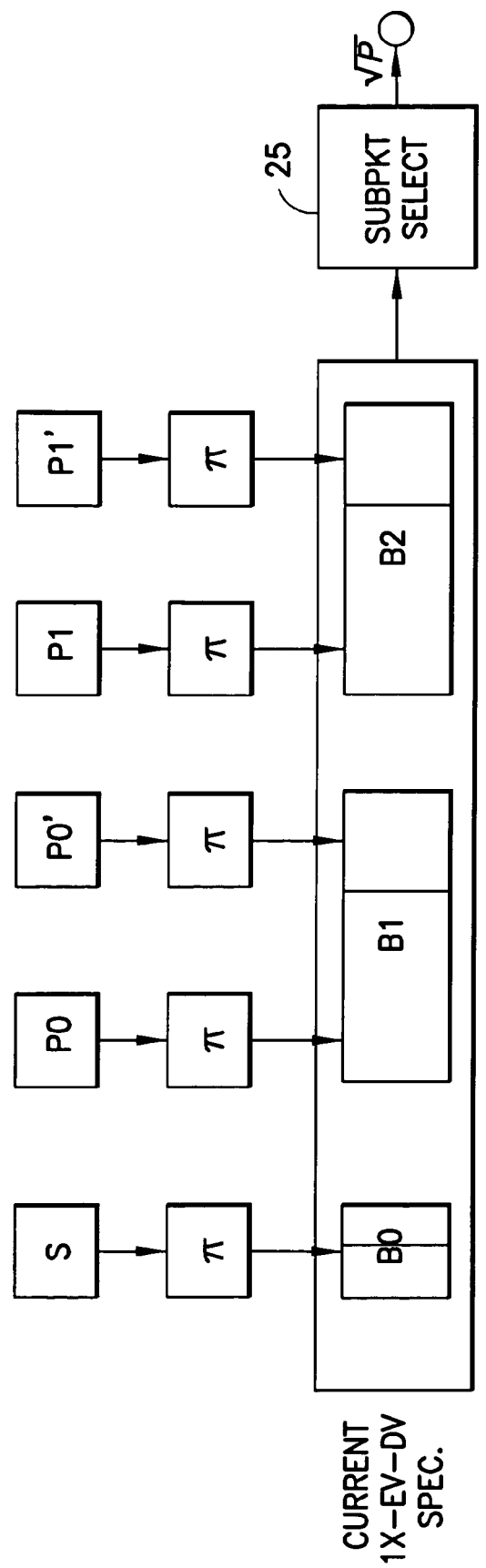
FIG. 3 is a block diagram of a conventional 1XEV-DV Packet Data Channel.

The current configuration of the packet data channel in the 1X-EV-DV forward link is shown in FIG. 3. The Per Antenna Rate Control (PARC) proposal suggests the transmission of two separate packets, each with a different packet size and modulation/coding scheme. Two information packets of sizes $N_1$ and $N_2$ are encoded separately and transmitted. The systematic symbols are designated with an S, and the parity bits with P0, P0' or P1, P1', corresponding to the use of the separate packets. The output block 25 represents a sub-packet selection algorithm.

Figure 4:
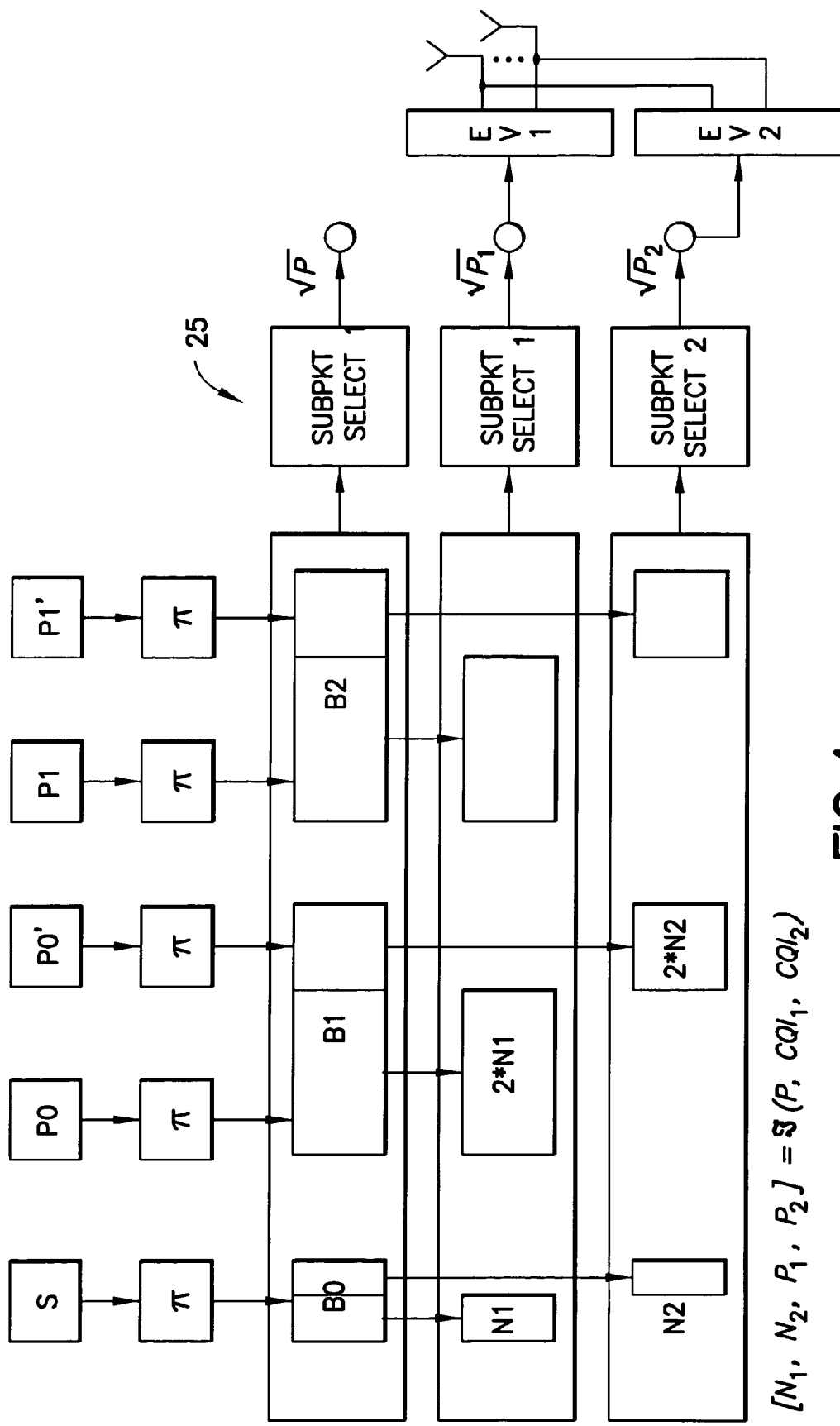
FIG. 4 is a block diagram of flexible rate split (FRS) MIMO system.

In contrast, the FRS MIMO approach shown in FIG. 4 encodes all the N bits, where N=$N_1$+$N_2$, into a single packet, and then distributes it into two streams. If the distribution is implemented by blind demultiplexing, then one arrives at the VBLAST algorithm. However, the FRS MIMO approach advocates an intelligent method of distributing the encoded packet into two sub-streams for MIMO transmission. The systematic (S) bits are divided into two sets of different sizes $N_1$, $N_2$, and similarly the parity bits (P0, P0' or P1, P1') are divided in the same ratio. Then sub-packet selection algorithm 25 acts independently on each of these two streams to obtain the required rate of transmission. For the first packet transmission, the selection procedure simply transmits all of the systematic bits and then as many parity bits as necessary. This procedure creates two streams with different rates attached to them, similar to the PARC procedure. The difference is that, in FRS-MIMO, the information bits are encoded and interleaved across space and time, whereas in PARC, they are encoded only across time. Also, the FRS MIMO approach uses an interleaver of size N in its single turbo encoder, as opposed to PARC, which uses two turbo interleavers of smaller sizes $N_1$ and $N_2$ respectively in its two turbo encoders.

Since the size of the interleaver of a turbo encoder has a bearing on its performance, there is an additional gain associated with FRS MIMO over PARC.

Once the two individual streams have been created, they are transmitted across multiple antennas. The transmission can take the following several forms. First, the two streams can be transmitted across two antennas, with a power imbalance. The stream carrying more information bits (hence higher rate) is assigned more power, while the stream carrying lesser information is assigned lesser power, while conforming to an overall total power constraint. Second, the two streams can be transmitted over two eigenmodes across multiple antennas. This entails the transmission of both streams over all the antennas, with suitable weighting. Here the number of transmitter 12 antennas can be greater than two.

In a least complex implementation of FRS MIMO, this aspect of the invention places as many systematic bits as possible on the better eigen stream, and the remaining systematic bits, as well as all of the parity bits, on the second (less strong) eigen stream.

First, a consideration is made of the symmetric allocation of Walsh codes, where the same number of Walsh codes are assigned to both of the streams. It can also be assumed that both streams use the same modulation. Then, for a coding rate (k) less than 0.5, all the systematic bits, and some parity bits, are transmitted through the first stream. On the other hand, when the coding rate of the packet is greater than 0.5, then the first stream is filled completely with systematic bits, and some systematic bits and all of the parity bits are transmitted through the second stream.

Figure 5:
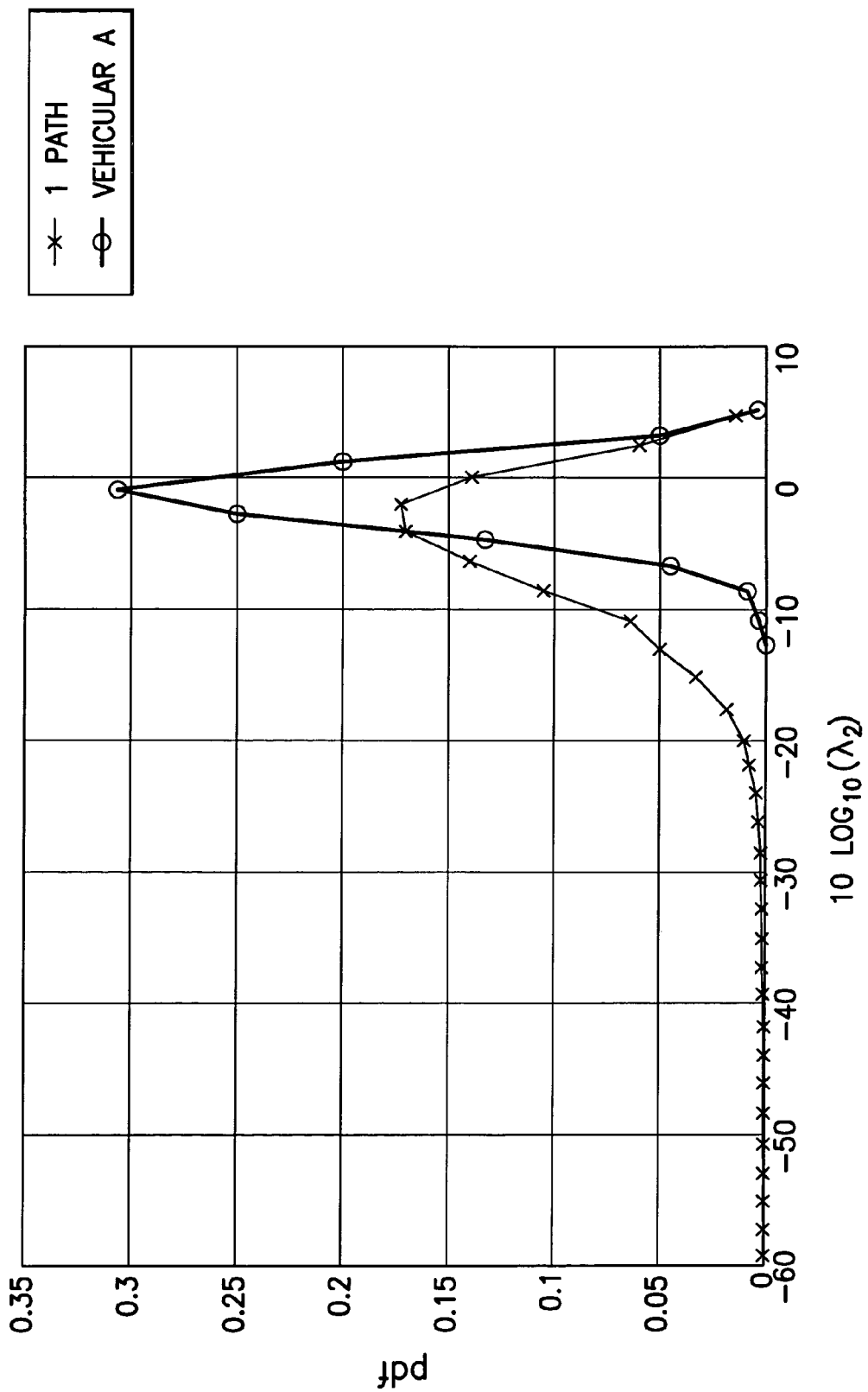
FIG. 5 is a graph that illustrates a distribution of second eigen-values in a 2×2 system: flat vs. frequency selective fading.

Consider now the channel matrix for a flat fading channel $H_{2 \times M_T}$, where $M_T$ is the number of transmitter 12 antennas, and the number of receiver 14 antennas is 2. It can be shown that, under ideal receiver assumptions, the strengths of the two streams at the receiver 14 are a function of the eigenvalues of the matrix $R=(HPH^H+\Lambda)$, where P is a diagonal matrix consisting of the transmit powers of the two streams and $\Lambda$ is the noise covariance matrix. FIG. 5 shows the distribution of the second eigenvalue of R, for the flat fading as well as the frequency selective (Vehicular A) cases. For the latter (Veh A), the eigenvalues were estimated by stacking the channel vectors from K different paths into a matrix of size $2 \times (M_T K)$.

It can be seen from FIG. 5 that the second eigenvalue takes on very low values more often in the flat fading channel. Whenever this occurs, the reliability of the second stream is very low. When the coding rate is greater than 0.5, at least some of the systematic bits are in this second stream, and they are received unreliably. This affects the decoding performance significantly, resulting in the loss of the entire frame.

This aspect of the invention employs an asymmetrical Walsh code allocation to rectify the above-mentioned effect. Consider a MIMO packet structure with a symmetrical Walsh code allocation, wherein a packet of size N is transmitted in MIMO fashion using L Walsh codes across two eigen-beams or antennas. Let each Walsh code be able to carry P coded symbols, and assume that the coding rate associated with the packet is k>0.5. The number of systematic bits in the turbo coded packet are thus kN. In the FRS embodiment, where the transmit control function 12B places as many systematic bits as possible in the better MIMO stream, N/2 systematic bits are placed in the first stream and the remaining (k−0.5)N bits are placed in the second stream.

Thus, and as was noted above, in this embodiment that employs the asymmetrical spreading code allocation the first eigen-beam/antenna is allocated $L_1=[(k-0.5)N/P]$ Walsh codes, while the second beam/antenna is allocated $L_2=2L-L_1$, Walsh codes. This process thus ensures that all the systematic bits are transmitted over the first beam/antenna.

Figure 6:
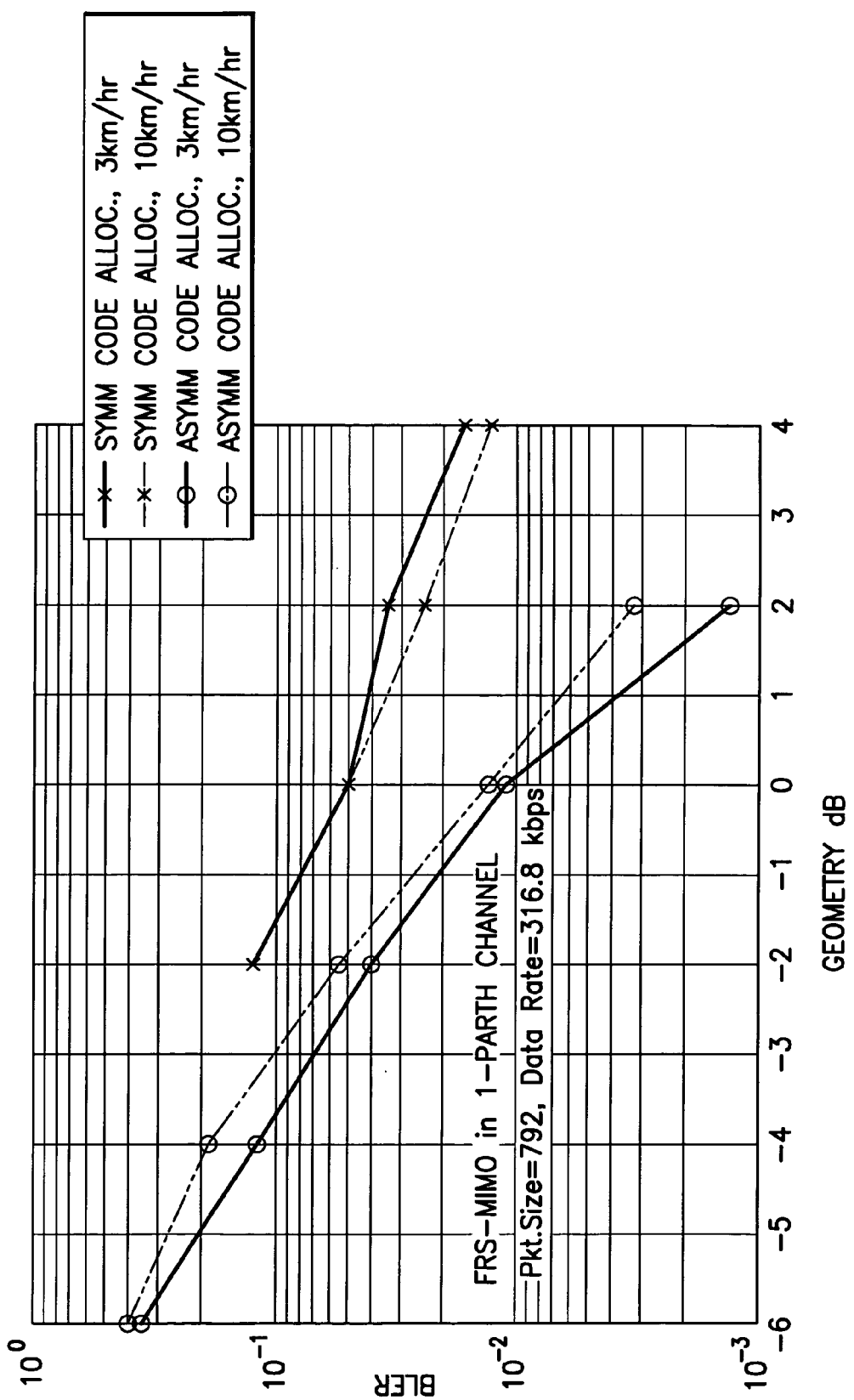
FIG. 6 is a graph showing the performance of an asymmetrical Walsh code allocation for FRS-MIMO in a 1-path channel, in accordance with an embodiment of this invention, where k=0.55, the symmetrical case uses four Walsh codes per eigen sub-channel, and the asymmetrical case in accordance with this embodiment of the invention uses five Walsh codes for the first eigen sub-channel and three Walsh codes for the second.

FIG. 6 shows the results of simulation and illustrates a comparison of block error rates for symmetric and asymmetric Walsh code allocation in FRS-MIMO at high coding rates. A packet size of 792 was used, with an effective coding rate of about 0.55. In the case of symmetric allocation, four Walsh codes are used for each eigen-beam. For the case of asymmetric allocation, five Walsh codes are used for the first eigen-beam and three Walsh codes are used for the second eigen-beam. The simulations show that there is a significant improvement in the performance of the link.

The use of this embodiment of the invention result in the sharing of only a few Walsh codes between two users, and thus does not trigger the more complex code sharing implications in some conventional Walsh code re-use techniques.

FIG. 7 is a flowchart depicting another method operating in accordance with the invention. The method starts at 710. Next, at 720, a DP 12C like that depicted in FIG. 1 executes program instructions that asymmetrically allocate spreading codes to a stronger eigen sub-channel and to a weaker eigen sub-channel such that the stronger eigen sub-channel is allocated more spreading codes than the weaker eigen sub-channel. Then, at 730, the DP 12C executes program instructions that cause the transmitting of all systematic bits of turbo-coded information over the stronger eigen sub-channel. The method stops at 740.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent wireless communication systems to the above-mentioned 1X-EV-DV system may be attempted by those skilled in the art, as may the use of a different type of packet data communication system altogether. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method to operate a wireless multiple input/multiple output MIMO communication system, comprising:

for N symbols of a frame of information to be transmitted through a plurality of eigen sub-channels, allocating $N_1$ symbols to a stronger eigen sub-channel and $N_2$ symbols to a weaker eigen sub-channel, where $N_1 > N_2$, and wherein N, $N_1$ and $N_2$ indicate, respectively, numbers of symbols;

determining a probability of reception error when transmitting the $N_2$ symbols through the weaker eigen sub-channel for an auxiliary signal-to-noise ratio;

solving for a quality of service QoS of the weaker eigen sub-channel; and if the QoS is less than a desired QoS, decreasing the value of N and repeating allocating symbols, determining the probability of reception error and solving for the QoS.

2. A method as in claim 1, where the symbols are systematic symbols output from a turbo coder.

3. A method as in claim 1, where decreasing the value of N has the effect of increasing the probability of error and decreasing the signal to noise ratio.

4. A method as in claim 1, further comprising selecting a first modulation technique for the $N_1$ symbols of the stronger eigen sub-channel and a second, different modulation technique for the $N_2$ symbols of the weaker eigen sub-channel.

5. A method as in claim 1, where the MIMO system comprises a flexible rate split FRS MIMO system, and further comprising asymmetrically allocating spreading codes to the stronger eigen sub-channel and to the weaker eigen sub-channel.

6. A wireless multiple input/multiple output MIMO communication system, comprising a transmitter having a plurality of antennas and a transmitter controller coupled to the antennas for generating eigen sub-channels towards a receiver, said transmitter controller comprising a data processor responsive to execution of a stored program, for N symbols of a frame of information to be transmitted through a plurality of eigen sub-channels, to allocate $N_1$ symbols to a stronger eigen sub-channel and $N_2$ symbols to a weaker eigen sub-channel, where $N_1 > N_2$, and wherein N, $N_1$ and $N_2$ indicate, respectively, numbers of symbols, to determine a probability of reception error when transmitting the $N_2$ symbols through the weaker eigen sub-channel for an auxiliary signal-to-noise ratio, to solve for a quality of service QoS of the weaker eigen sub-channel and, responsive to a case where the QoS is less than a desired QoS, to decrease the value of N and to repeat allocating symbols, determining the probability of reception error and solving for the QoS.

7. A MIMO communication system as in claim 6, where the symbols are systematic symbols output from a turbo coder.

8. A MIMO communication system as in claim 6, where decreasing the value of N has the effect of increasing the probability of error and decreasing the signal to noise ratio.

9. A MIMO communication system as in claim 6, where said data processor further selects a first modulation technique for the $N_1$ symbols of the stronger eigen sub-channel and a second, different modulation technique for the $N_2$ symbols of the weaker eigen sub-channel.

10. A MIMO communication system as in claim 6, where the MIMO communication system comprises a flexible rate split FRS MIMO system, and where said data processor operates to asymmetrically allocate spreading codes to the stronger eigen sub-channel and to the weaker eigen sub-channel.

11. A MIMO communication system as in claim 6, where the transmitter is embodied in a base station, and where the receiver is embodied in a portable terminal.

12. A MIMO communication system as in claim 6, where the transmitter is embodied in a portable terminal, and where the receiver is embodied in a base station.

13. A method to operate a wireless multiple input/multiple output MIMO communication system, comprising:

for N symbols of a frame of information to be transmitted through a plurality of eigen sub-channels, allocating $N_1$ symbols to a stronger eigen sub-channel and $N_2$ symbols to a weaker eigen sub-channel, where $N_1 > N_2$, and wherein N, $N_1$ and $N_2$ indicate, respectively, numbers of symbols;

determining a probability of reception error when transmitting the $N_2$ symbols through the weaker eigen sub-channel for an auxiliary signal-to-noise ratio;

solving for a quality of service QoS of the weaker eigen sub-channel;

if the QoS is less than a desired QoS, decreasing the value of N and repeating allocating symbols, determining the probability of reception error and solving for the QoS, where during allocating, determining and solving the method further jointly adapts at least a constellation size and a number of spreading codes in an asymmetric allocation of spreading codes.

14. A wireless multiple input/multiple output MIMO transmitter comprising a plurality of antennas and a transmitter controller coupled to the antennas for generating eigen sub-channels towards a receiver, said transmitter controller comprising a data processor responsive to execution of a stored program, for N symbols of a frame of information to be transmitted through a plurality of eigen sub-channels, to allocate $N_1$ symbols to a stronger eigen sub-channel and $N_2$ symbols to a weaker eigen sub-channel, where $N_1 > N_2$, and wherein N, $N_1$ and $N_2$ indicate, respectively, numbers of symbols, to determine a probability of reception error when transmitting the $N_2$ symbols through the weaker eigen sub-channel for an auxiliary signal-to-noise ratio, to solve for a quality of service QoS of the weaker eigen sub-channel and, responsive to a case where the QoS is less than a desired QoS, to decrease the value of N and to repeat allocating symbols, determining the probability of reception error and solving for the QoS, where during allocating, determining and solving said transmitter controller jointly adapts at least a constellation size and a number of spreading codes in an asymmetric allocation of spreading codes.

* * * * *

UNITED STATES PATENT AND TRADEMARK OFFICE
CERTIFICATE OF CORRECTION

PATENT NO. : 7,599,443 B2
APPLICATION NO. : 10/940060
DATED : October 6, 2009
INVENTOR(S) : Ionescu et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 538 days.

should read (*) Notice: Subject to any disclaimer, the term of this patent is extended or adjusted under 35 U.S.C. 154(b) by 1,187 days.

In the drawings, Sheet 6, Fig. 6, please delete "PARTH" and insert --PATH--.

At Col. 1, line 47, please delete "Fochsini" and insert --Foschini--.

At Col. 2, line 2, please delete "Fochsini" and insert --Foschini--.

At Col. 3, line 25, please delete "1968;T. M." and insert --1968; T. M.--.

At Col. 3, line 57, please delete "preceding" and insert --precoding--.

At Col. 4, line 8, please delete "preceding" and insert --precoding--.

At Col. 9, lines 15-16, please delete "$d_2=(\Gamma_2\lambda_1^-{}_1)$" and insert --$d_2=(\Gamma_2\lambda_1^{-1})$--.

At Col. 10, line 11, please delete "packet, of" and insert --packet of--.

At Col. 12, line 35, please delete "but".

Signed and Sealed this

Eighteenth Day of May, 2010

David J. Kappos
*Director of the United States Patent and Trademark Office*